(12) United States Patent
Chen (10) Patent No.: US 10,284,013 B2
(45) Date of Patent: *May 7, 2019

(54) RADIO FREQUENCY TRANSMISSION DEVICE WITH REDUCED POWER CONSUMPTION

(71) Applicant: Marcellus Chen, Fremont, CA (US)

(72) Inventor: Marcellus Chen, Fremont, CA (US)

( * ) Notice: Subject to any disclaimer, the term of this patent is extended or adjusted under 35 U.S.C. 154(b) by 305 days.

This patent is subject to a terminal disclaimer.

(21) Appl. No.: 15/181,090

(22) Filed: Jun. 13, 2016

(65) Prior Publication Data

US 2016/0372974 A1    Dec. 22, 2016

Related U.S. Application Data (63) Continuation of application No. 14/211,478, filed on Mar. 14, 2014, now Pat. No. 9,369,163.

(60) Provisional application No. 61/798,551, filed on Mar. 15, 2013.

(51) Int. Cl.
| | |
|---|---|
| *H01F 27/42* | (2006.01) |
| *H01F 37/00* | (2006.01) |
| *H01F 38/00* | (2006.01) |
| *H02J 50/10* | (2016.01) |
| *H04B 1/16* | (2006.01) |
| *H04W 52/02* | (2009.01) |
| *H02J 50/90* | (2016.01) |
| *H04B 1/38* | (2015.01) |
| *H04B 5/00* | (2006.01) |
| *H04B 1/04* | (2006.01) |

(52) U.S. Cl.
CPC ............. *H02J 50/10* (2016.02); *H02J 50/90* (2016.02); *H04B 1/1607* (2013.01); *H04B 1/38* (2013.01); *H04B 5/0037* (2013.01); *H04W 52/0296* (2013.01); *H04B 1/04* (2013.01); *Y02D 70/40* (2018.01); *Y02D 70/42* (2018.01)

(58) Field of Classification Search
CPC ........ H02J 50/10; H02J 50/90; H04B 1/1607; H04B 1/38; H04B 5/0037; H04B 1/04; H04W 52/0296; Y02D 70/40; Y02D 70/42
USPC ......................................................... 307/104
See application file for complete search history.

(56) References Cited

U.S. PATENT DOCUMENTS

| | | | |
|---|---|---|---|
| 8,416,721 B1 | 4/2013 | Chen | |
| 2004/0038660 A1* | 2/2004 | He | ........................ H01Q 1/2291 455/277.1 |
| 2004/0219888 A1* | 11/2004 | Iwamoto | .................. H04B 1/52 455/76 |

(Continued)

OTHER PUBLICATIONS

Office Action dated Jul. 31, 2015 in parent U.S. Appl. No. 14/211,478.

*Primary Examiner* — Hal Kaplan
*Assistant Examiner* — Toan Vu
(74) *Attorney, Agent, or Firm* — Kim & Stewart LLP (57) ABSTRACT

A system for enhancing power efficiency of a wireless device is disclosed. In one embodiment, the wireless device includes a transmitter having a transmitter antenna and configured to transmit a signal, as well as an energy receiver having a plurality of energy receiver antenna elements positioned across one or more surfaces of the wireless device. The energy receiver antenna elements are each configured to receive a portion of the signal, convert the portion of the signal into power, and provide the power to one or more components of the wireless device.

18 Claims, 7 Drawing Sheets

(56) References Cited

U.S. PATENT DOCUMENTS

| | | | |
|---|---|---|---|
| 2005/0200516 A1* | 9/2005 | Brown | G01S 13/32 342/90 |
| 2006/0038658 A1* | 2/2006 | Jarvis | G06K 7/0008 340/10.1 |
| 2007/0224942 A1* | 9/2007 | Kuramoto | H01Q 1/2216 455/67.11 |

* cited by examiner

RADIO FREQUENCY TRANSMISSION DEVICE WITH REDUCED POWER CONSUMPTION

CROSS-REFERENCE TO RELATED APPLICATIONS

This application is a continuation of, and claims the benefit of, U.S. patent application Ser. No. 14/211,478, entitled "Radio Frequency Transmission Device with Reduced Power Consumption," filed on Mar. 14, 2014, which itself claims priority to U.S. provisional application having Ser. No. 61/798,551, filed on Mar. 15, 2013, both of which are hereby incorporated by reference in their entireties.

BACKGROUND OF THE INVENTION

Field of the Invention

This disclosure relates generally to electrical circuits, and more particularly to a radio frequency (RF) transmission apparatus with reduced power consumption.

Description of Related Prior Art

Figure 1:
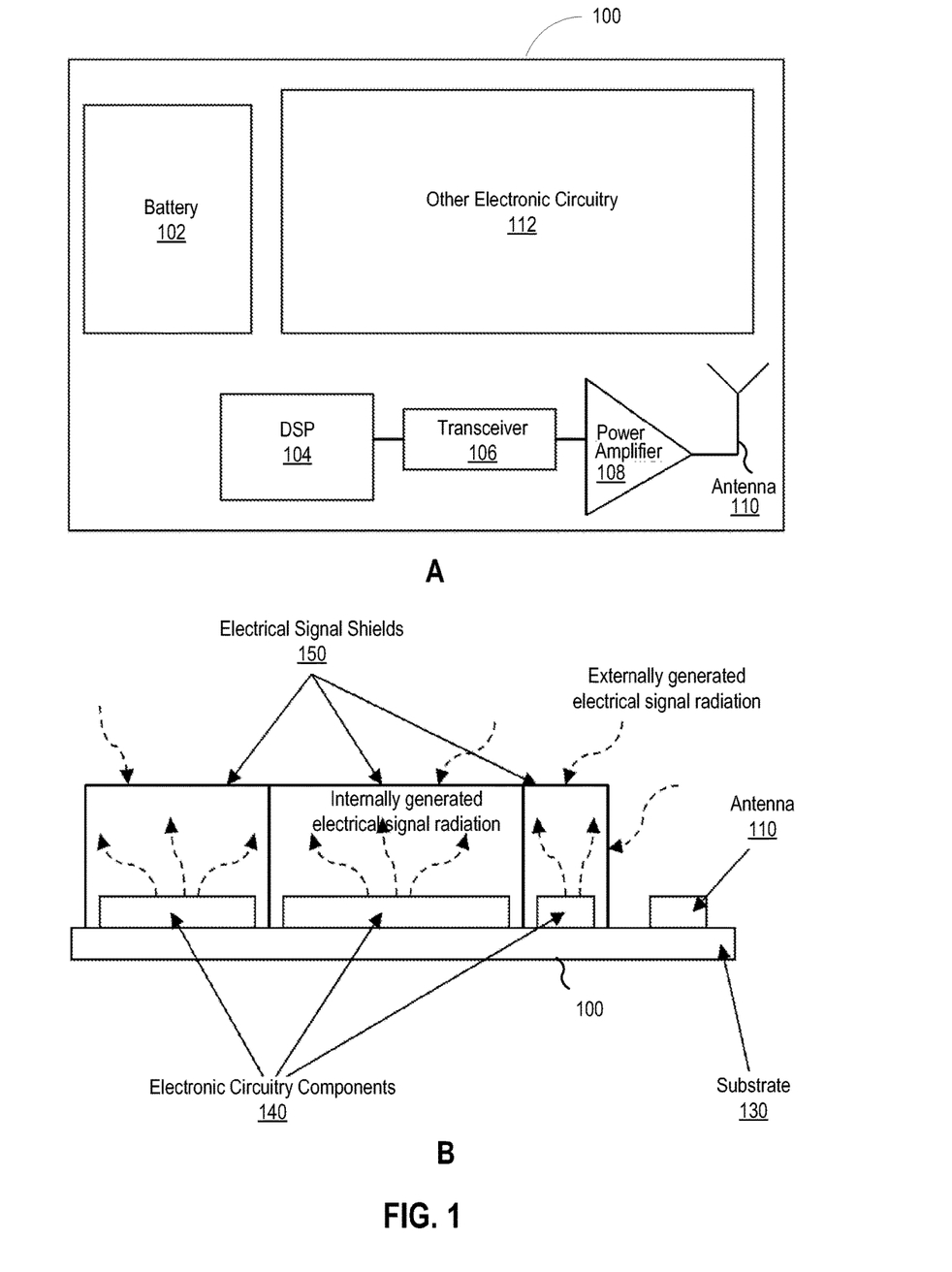
FIG. 1 illustrates top and side views of a conventional wireless device.

FIG. 1, panel A, depicts a top view of a conventional wireless communication device 100. Common wireless communication devices include cellular phones, wireless networking devices, wireless handsets, personal digital assistants (PDAs), laptop and desktop computers, routers, and key fobs. As shown, the wireless communication device 100 includes a battery 102, a digital signal processor (DSP) 104, a transceiver 106, a power amplifier 108, an antenna 110, and other electronic circuitry 112. The battery 102 provides direct current (DC) power to other device components. The digital signal processor (DSP) 104 manipulates communication signals between analog and digital signal processing domains, while the transceiver 106 up and down converts the communication signals between low frequencies and RF frequencies. The power amplifier 112 amplifies a power of the signal output from the transceiver to drive a transmission signal into the antenna 110. In turn, the antenna 110 transmits the transmission signal into free space. A receiver of another wireless communication device (not shown) may receive the radiated signal through a receiver antenna and process the received signal, thus allowing wireless communication of information between the wireless communication device 100 and the other wireless communication device.

Panel B depicts a side view of the conventional wireless communication device 100. As shown, the antenna 110 and electronic circuitry components 140 (e.g., the DSP 104, the transceiver 106, etc.) are mounted on a substrate 130 such as a printed circuit board (PCB). In addition, the wireless communication device 100 includes an electrical shield 150 which can serve two purposes: (1) preventing internally generated electrical signals from radiating out to affect the function of other components; and (2) preventing externally generated electrical signals from radiating in to affect the function of the components 140.

Figure 2:
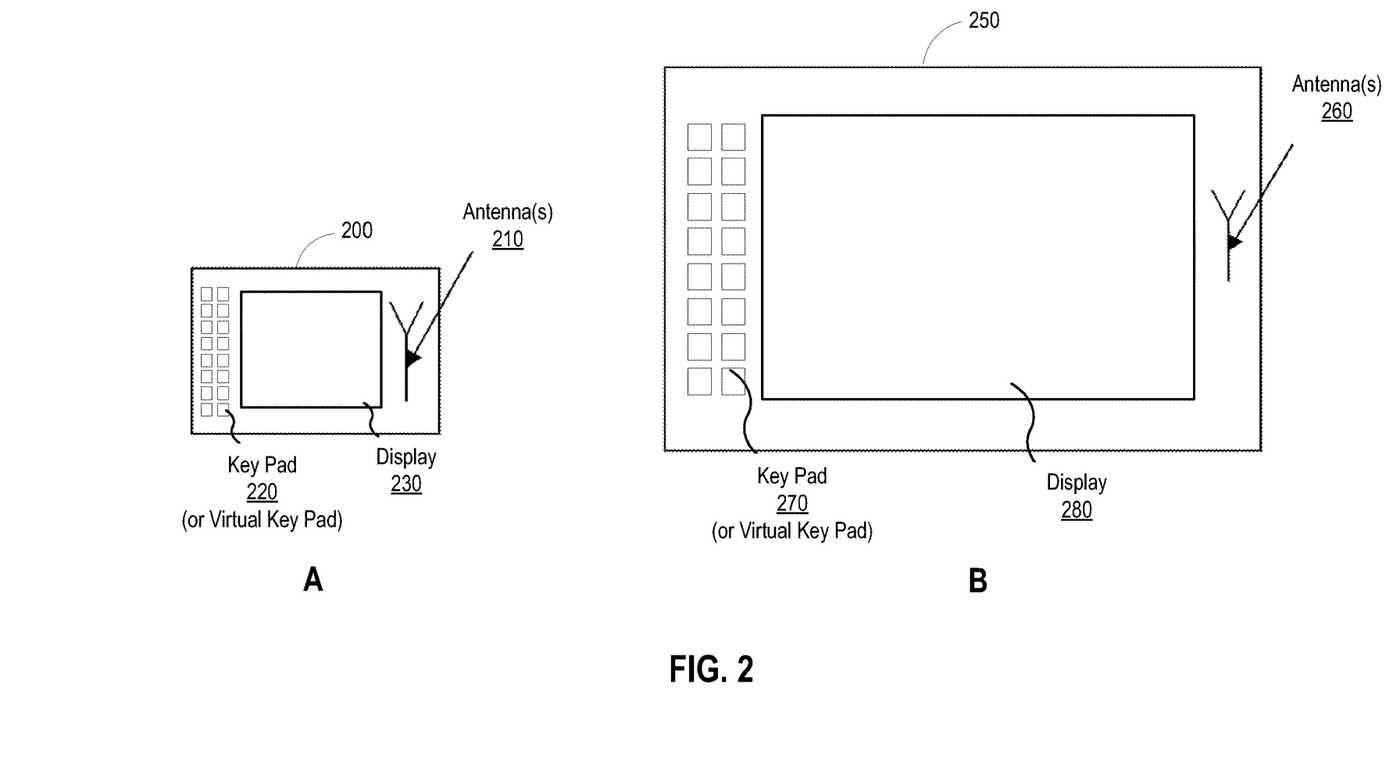
FIG. 2 depicts an enclosure of a convention wireless communication device.

FIG. 2 depicts an enclosure of a convention wireless communication device. Panel A shows a wireless phone device 200 and panel B shows a wireless tablet device 250. As illustrated in panel A, the wireless phone device 200 includes antenna(s) 210 for transmitting and/or receiving radio frequency signals. The wireless phone device 200 further includes a key pad 220 for tactile input and a display screen 230 for display and/or tactile input. Although a physical key pad 220 is shown, the wireless phone device 200 may alternatively include a virtual key pad (not shown), which is a software component that permits key stokes to be made via, e.g., a touch screen. In addition, the wireless phone device 200 includes casing which holds all the electronic components and component mounting substrates of the wireless phone device 200. The casing may also electrically isolate the internal components of the wireless phone device 200 from the exterior. A back cover (not shown) of the wireless phone device 200 may also include casing made from various materials. Similarly, the wireless tablet device 250 includes antenna(s) 260, a key pad 270 (or a virtual keypad), and a display screen 280 which may generally perform the same functions as the antenna(s) 210, the key pad 220, and the display screen 230 of the wireless phone device 200. In addition, the wireless tablet device 250 may also include a casing that encloses electronic components and component mounting substrates and electrically insulates these components, as well as a back cover.

SUMMARY OF INVENTION

Embodiments of the invention described herein enable radio frequency (RF) transmission devices to receive transmission power that is radiated onto the surfaces of the devices. In one embodiment, a wireless device is provided. The wireless device includes a transmitter having a transmitter antenna and configured to transmit a signal. The wireless device also includes an energy receiver having a plurality of energy receiver antenna elements positioned across one or more surfaces of the wireless device. The energy receiver antenna elements are each configured to receive a portion of the signal, convert the portion of the signal into (DC) power, and provide the (DC) power to one or more components of the wireless device.

In another embodiment, a wireless device is provided that includes a transmitter having a transmitter antenna and an energy receiver antenna. The transmitter antenna is configured to transmit a signal. The wireless device also includes an energy receiver having a receiver antenna and configured to receive a portion of the signal, convert the portion of the signal into power, and provide the power to one or more components of the wireless device. The receiver antenna is configured as a weakened antenna which does not efficiently receive the portion of the signal.

In yet another embodiment, a wireless device is provided that includes a transmitter having a transmitter antenna and an energy receiver having first and second receiver antennas. The transmitter antenna is configured to transmit a signal. The first and second receiver antennas are configured to receive a portion of the signal, convert the portion of the signal into power, and provide the power to one or more components of the wireless device. Frequency centers of the transmitter antenna and the first receiver antenna are matched, while frequency centers of the transmitter antenna and the second receiver antenna are not matched.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION

Figure 3:
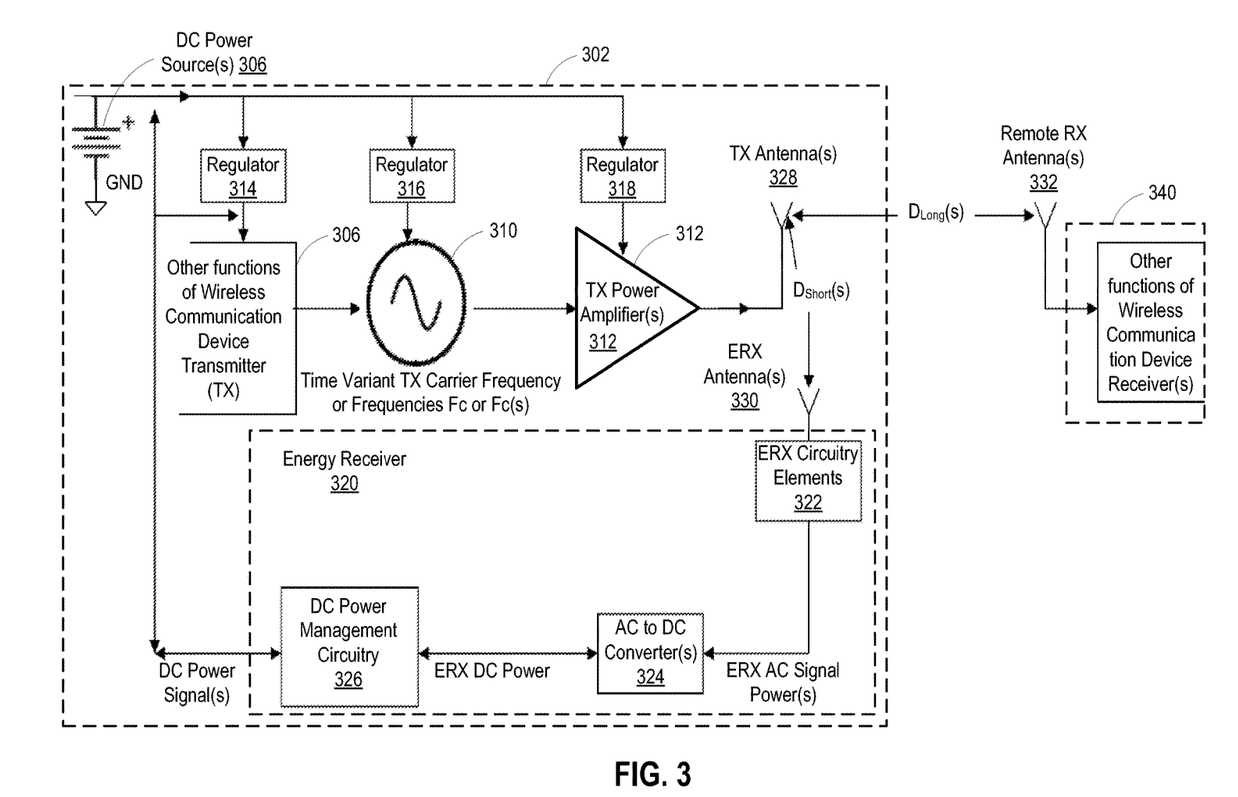
FIG. 3 is a block diagram of a wireless communication device configured to receive power from its own transmissions, according to an embodiment.

FIG. 3 depicts a wireless communication device 302 configured to receive power from its own transmissions, according to an embodiment. As shown, the wireless communication device 302 includes direct current (DC) power source(s) 306 that provide power to a modulator 310, power amplifier(s) 312, and components performing other functions of the wireless communication device transmitter (TX) 308 which may include a transmit processor having a time variant transmit carrier frequency or frequencies (Fc or Fc(s)). The wireless communication device 302 further includes (optional) regulators 314, 316, 318 that respectively provide correct voltage and/or current regulation to the components 308, the modulator 310, and the power amplifier(s) 312. The modulator 310 may include a voltage controlled oscillator and phase lock loop to select a given transmit frequency from a range of possible transmit frequencies. The power amplifier 312 amplifies a power of a modulated signal output from the modulator 310. The output of the power amplifier 312 (also referred to herein as "TX signal power") is transmitted through a transmit antenna 328 into free space. Remote receiver antenna(s) 332 may then receive the radiated signal and process the received signal, thus allowing wireless communication of information between the wireless device 302 and the remote wireless device 340.

RF transmit (TX) signal power radiated by transmit antenna(s) 328 may be high in order to compensate for the distance from remote receiver antenna(s) 332 and to compensate for any signal power lost due to DC power signal(s) circuitry objects blocking the signal path. As is well known, RF signal power degrades by distance squared. For example, if transmit antenna(s) 328 transmit 1-2 Watts of RF signal power, the remote receiver antenna(s) 332 might only receive a few uW of RF signal power. This low level of RF signal power is typically enough for functional wireless communication.

As shown, the wireless communication device 302 includes an energy receiver 320 that includes an energy receiver (ERX) antenna 330 and energy receiver circuitry element(s) 322 configured to receive a time variant communication signal and alternating current (AC) to DC converter(s) 324 configured to convert the received communication signal into DC power. That is, RF transmission signal power generated by the transmit antenna(s) 328 is received and converted into DC power which can provide electrical power to the wireless device 302 for operation and/or battery charging. The energy receiver 320 further includes a DC power management circuit 326 that can provide proper voltage levels of DC power to circuits (or components) within the wireless communication device 302.

As shown, the energy receiver antenna(s) 330 are placed within a short, fixed distance $D_{short}(s)$ from transmit antenna(s) 328. Because the distance between the transmit antenna(s) 328 and the energy receiver antenna(s) 330 is short, a substantial amount of transmission signal power can be received at the energy receiver antenna(s) 330 and converted for DC power use. One approach for receiving and converting such transmission signal power is described in U.S. Pat. No. 8,416,721, which is hereby incorporated by reference in its entirety.

Figure 4:
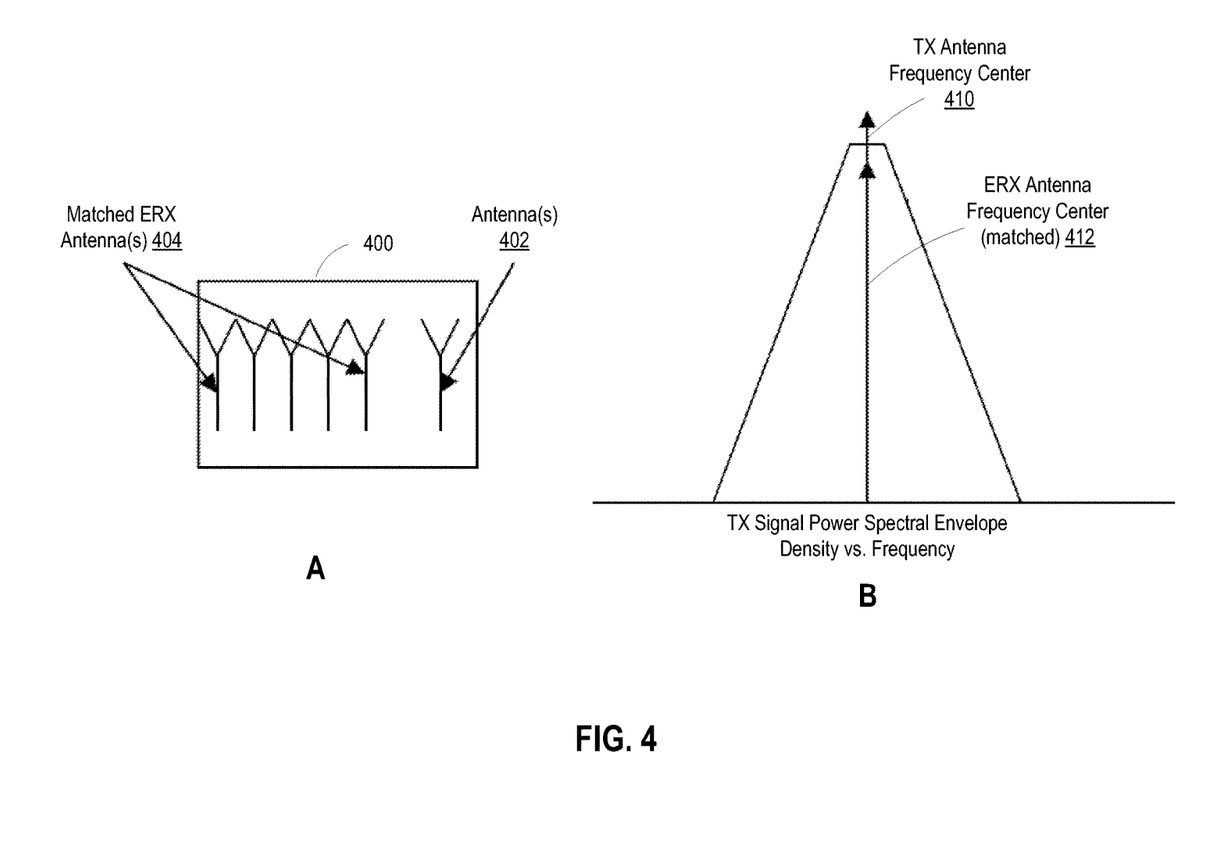
FIG. 4 illustrates matched energy receiver antennas substantially covering the surface of a wireless communication device, according to an embodiment.

FIG. 4 illustrates matched energy receiver antennas substantially covering the surface of a wireless communication device 400, according to an embodiment. As shown in panel A, the wireless communication device 400 includes transmit antenna(s) 402 and one or more matched energy receiver antenna(s) 404 covering a surface of the wireless phone device 400. Illustratively, the frequency of the energy receiver antenna(s) 404 are deliberately matched to the transmission frequency of the wireless device's 400 own transmit antenna(s) 402. Panel B illustrates a graph of the transmission signal power spectral envelope density versus frequency in the wireless communication device 400 having energy receiver antenna(s) 404 matching the frequency of transmit antenna(s) 402. As shown, the frequency 401 of the energy receiver antenna is matched to the frequency center of the transmit antenna. The matching of the frequency of the energy receiver antenna(s) 404 to the transmission frequency of the transmit antenna(s) 402 permits the energy receiver antenna(s) 404 to most efficiently receive the transmission power radiated onto the surface of the wireless phone device 400.

In one embodiment, the surface of the wireless device 400 may be maximally covered by energy receiver antenna(s) 404, except for areas needed for other critical functions, such as the screen, key pad, and transmit/receiver antennas. In another embodiment, energy receiver antenna(s) 404 may also be placed under the key pad, screen, etc. Trial and error and/or antenna software simulation may be used to determine the spacing needed between energy receiver antenna(s) 404 and transmit antenna(s) 402 to prevent interference to the transmission and receiving functions required by the wireless device 400. More specifically, an effective distance between the energy receiver antenna(s) 404 and the transmit/receiver antenna(s) may be determined based on various optimization factors, such as maximizing the energy received, with the least amount of interference to the transmission, and placing the energy receiver antenna(s) at an effective distance to the transmit antenna(s) 404.

Experience has shown that, in a particular embodiment, a 34% power consumption reduction was achieved when the surface of a typical wireless device was covered with matched antenna(s), with the entire back surface and the left, right, and bottom sides covered with matched antenna(s) and only the keypad, screen and half an inch within the transmit/ receiver antenna being left un-covered. Further, no significant transmission/reception signal impairment was measured.

Figure 5:
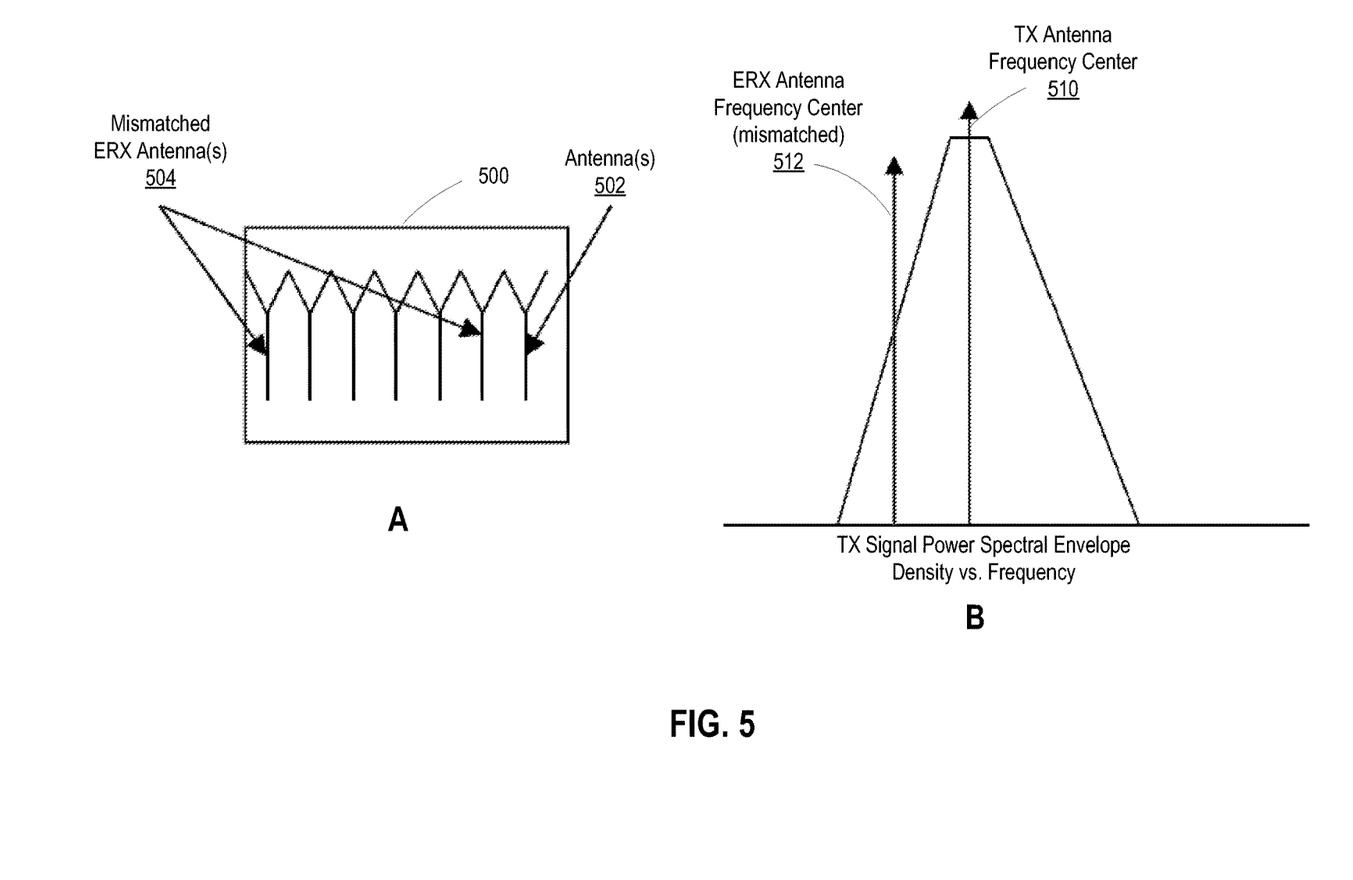
FIG. 5 illustrates mismatched energy receiver antennas substantially covering the surface of a wireless communication device, according to an embodiment.

FIG. 5 illustrates mismatched energy receiver antennas substantially covering the surface of a wireless communication device 500, according to an embodiment. As shown, the wireless communication device 500 includes antenna(s) for transmission of signals as well as energy receiver antenna(s) 504 configured to receive transmission power from the transmit antenna(s) 502 so that the transmission power can be converted to energy for use by the wireless communication device 500.

The energy receiver antenna(s) 504 are deliberately weakened so as to not efficiently receive the transmission power radiated by the transmit antenna 502(s). A number of organic and non-organic materials such as human tissue, printed circuit boards, wireless device casing, are capable of absorbing radiated RF transmission power to varying degrees. For example, human tissue acts as an inefficient antenna which does not match a transmit antenna frequency center. In one embodiment, the energy receiver antenna(s) 504 may be constructed from such materials.

In another embodiment, energy receiver antenna(s) 504 may be deliberately weakened by shifting the frequency center of the energy receiver antenna(s) 504 away from the frequency center of the transmit antenna(s) 502 by, e.g., calibrating the energy receiver antenna(s) 504 to be mismatched with the transmit antenna(s) 502. Panel B illustrates a graph of the transmission signal power spectral envelope density versus frequency in the wireless communication device 500 having mismatched energy receiver antenna(s) 504. This mismatching makes the energy receiver antenna(s) 504 less efficient at receiving the transmission power radiated onto the surface of the wireless device 500. As a result, one or more mismatched energy receiver antenna(s) 504 may be placed next to the transmit/receiver antenna 502, at a closer distance than matched energy receiver antennas could be placed, without affecting normal RF functions. Because transmission RF power degrades by distance squared, less efficient energy receiver antennas placed closer to the transmit antenna(s) 502 may actually be equal to or more efficient than matched energy receiver antennas placed further away from the transmit antenna(s) 502.

Illustratively, the wireless device 500 is maximally covered by the mismatched energy receiver antenna(s) 504, except for regions needed for other critical functions, such as a key pad, display screen, and transmit/receiver antenna(s). In another embodiment, energy receiver antenna(s) may also be placed underneath the key pad and/or the display screen. If necessary to prevent interference to transmission/reception functions, the spacing between the energy receiver antenna(s) 504 and transmit/receiver antennas may be obtained by trial and error and/or antenna software simulation.

Experience has shown that in a particular embodiment, in which a wireless devices with non-matching transmit antennas having different communication standards/frequencies than energy receiver antennas were placed in close proximity to the energy receiver antennas, the energy receiver antennas still received non-matching transmission power which could be converted to DC power. In addition, no substantial transmission/reception signal power degradation was measured.

Figure 6:
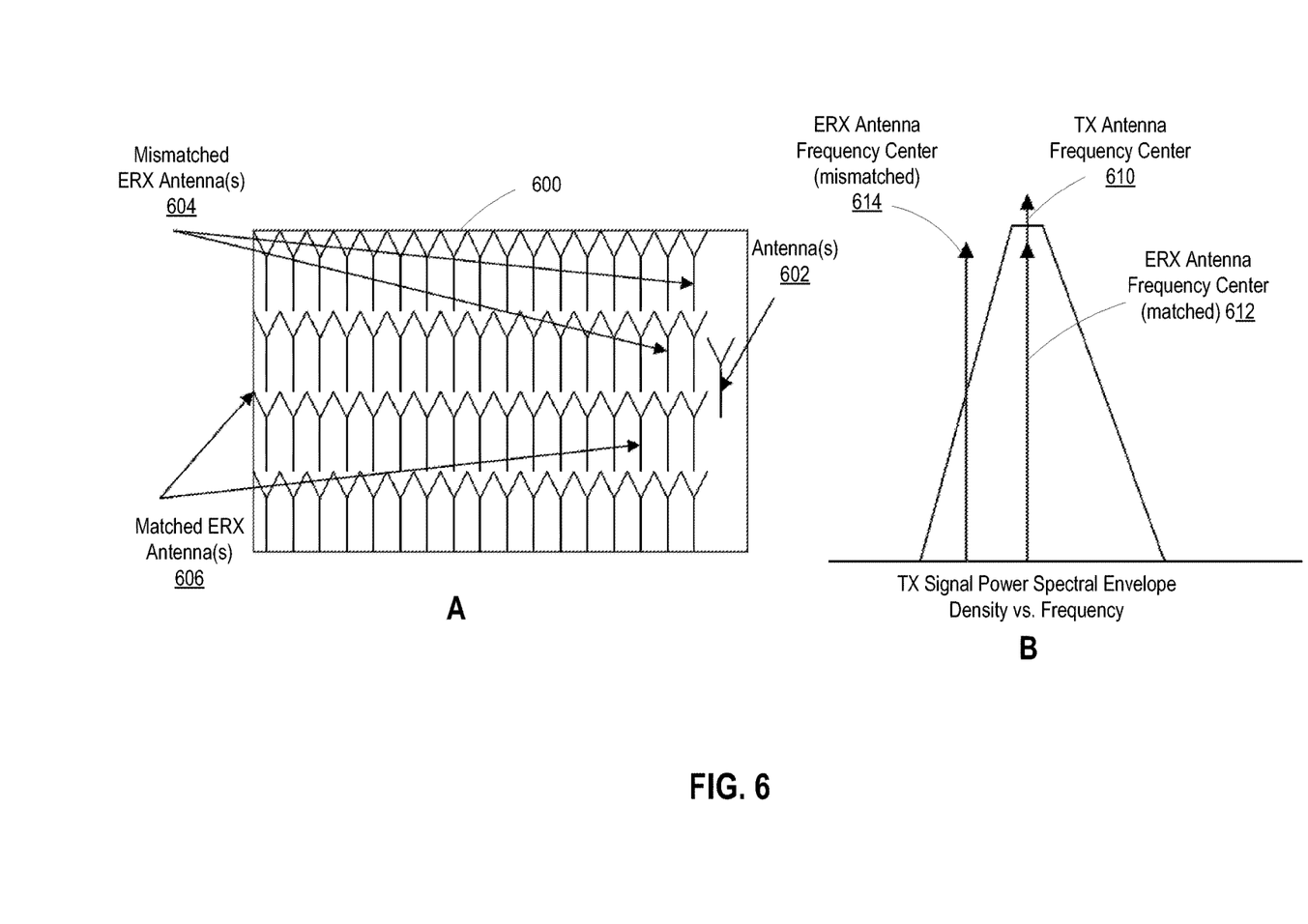
FIG. 6 illustrates combining matched and mismatched energy receiver antennas to substantially cover the surface of a wireless communication device, according to an embodiment.

FIG. 6 illustrates combining matched and mismatched energy receiver antennas to substantially cover the surface of a wireless communication device 600, according to an embodiment. As shown in panel A, the wireless communication device 600 includes two rows of mismatched, and deliberately less efficient, antenna(s) 604 placed close to the wireless device's 600 transmit antenna(s) 602. As discussed, the deliberately less efficient antenna(s) 604 may be, e.g., made of materials capable of absorbing radiated RF transmission power but not interfering with transmission or reception of RF signals. The less efficient antenna(s) 604 may also have frequency center(s) that are mismatched with frequency center(s) of the transmit antenna(s) 602. The wireless device 600 also includes rows of matched antennas 606 placed further away from the wireless device's 600 transmit antenna(s) 602 than the mismatched antenna(s) 604 are placed. As discussed, the matched antenna(s) 606 can receive radiated transmission power more efficiently than the mismatched antennas 604. Panel B illustrates a graph of the transmission signal power spectral envelope density versus frequency in the wireless communication device 600 having both matched energy receiver antenna(s) 606 and mismatched energy receiver antenna(s) 604. Once again, to prevent interference to the transmission/reception functions of the wireless device 600, the spacing needed between energy receiver antenna(s) 604, 606 and transmit/receiver antenna(s) may be obtained by trial and error and/or antenna software simulation. By using both mismatched antennas 604 and matched antennas 606, it is possible to maximize the space on the surface of the wireless device 600 on which energy receiver antennas are placed.

Figure 7:
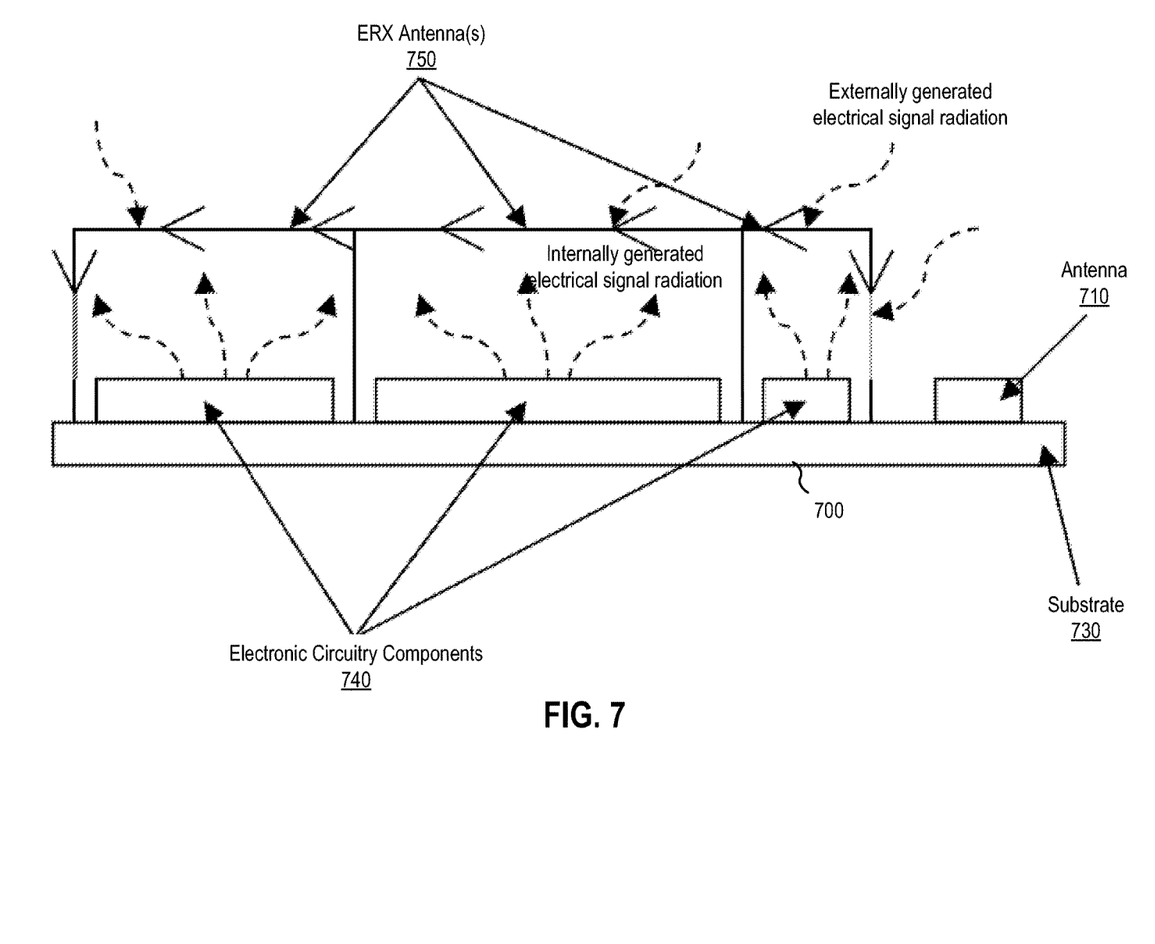
FIG. 7 illustrates use of energy receiver antennas as electrical shields in a wireless communication device, according to an embodiment.

FIG. 7 depicts use of energy receiver antennas as electrical shields in a wireless communication device 700, according to an embodiment. As shown, the wireless communication device 700 includes a transmit antenna 710 and electronic circuitry components 740 mounted on a substrate 730. The transmit antenna 710, electronic circuitry components 740, and substrate 730 may be similar to the transmit antenna 110, electronic circuitry components 140, and substrate 130 of the wireless communication device 100, discussed above. Rather than the electrical signal shields 150 of the wireless communication device 100, however, the wireless communication device 700 includes energy receiver antennas 750. The energy receiver antenna(s) 750 may have any feasible shape, including the same shape as the electrical signal shields 150. In addition to receiving radiated transmission power, the energy receiver antenna(s) 750 may also perform the same function as the electrical signal shields 150, namely preventing internally generated electrical signals from radiating out and affecting the function of other devices and preventing externally generated electrical signals from radiating in to affect the function of the electronic circuitry components 740. As a result, energy receiver antennas 750 may replace electrical signal shields which are grounded. Replacing such electrical signal shields with energy receiver antennas 750 permits maximal use of available space for energy receiver antennas.

Advantageously, wireless devices disclosed herein include energy receiver antennas that receive the wireless devices' own transmission signals that are radiated onto the surfaces of the wireless devices. The received transmission signals are then converted to DC power that can be provided to various components of the wireless devices. Doing so reduces power consumption by the wireless devices and extends battery life.

While the forgoing is directed to embodiments of the present invention, other and further embodiments of the invention may be devised without departing from the basic scope thereof.

What is claimed is:

1. A wireless device comprising:
   a transmitter having a transmitter antenna and configured to transmit a signal; and
   an energy receiver having a plurality of energy receiver antenna elements positioned across one or more surfaces of the wireless device, wherein the energy receiver antenna elements are each configured to receive a portion of the signal, convert the portion of the signal into power, and provide the power to one or more components of the wireless device,
   wherein at least one of the energy receiver antenna elements is a weakened receiver antenna.

2. The wireless device of claim 1, wherein a frequency center of the transmitter antenna and a frequency center of at least one of the energy receiver antenna elements are matched.

3. The wireless device of claim 1, wherein the weakened receiver antenna is mismatched with the transmitter antenna in a manner that reduces a level of interference with transmissions from the transmitter antenna.

4. The wireless device of claim 1, wherein the frequency center of the transmitter antenna and a frequency center of the weakened receiver antenna are not matched.

5. The wireless device of claim 1, wherein the transmitter antenna is a first material and the weakened receiver antenna is a second material different from the first material.

6. The wireless device of claim 1, wherein the weakened antenna is positioned closer to the transmitter antenna than is at least one of the energy receiver antenna elements having a frequency center matching the frequency center of the transmitter antenna.

7. The wireless device of claim 1, wherein the plurality of energy receiver antenna elements are positioned to substantially cover at least one surface of the wireless device, and none of the plurality of energy receiver antenna elements are positioned on at least one surface region upon which a key pad, a display screen, the transmitter antenna, or a receiver antenna of the wireless device is located.

8. The wireless device of claim 1, further comprising electronic circuitry components and an electrical signal shield for the electronic circuitry components, wherein one or more of the energy receiver antenna elements are integrated into the electrical signal shield.

9. The wireless device of claim 1, wherein the wireless device is one of a cellular phone, a wireless networking device, a wireless handset, a personal digital assistant (PDA), a laptop computer, a desktop computer, a router, or a key fob.

10. The wireless device of claim 1, wherein each of the plurality of energy receiver antenna elements is a weakened receiver antenna.

11. The wireless device of claim 1, wherein the plurality of energy receiver antenna elements is positioned to substantially cover at least one surface of the wireless device, and at least one energy receiver antenna element of the plurality of energy receiver antenna elements is positioned underneath at least one of a key pad or a display screen of the wireless device.

12. A wireless device comprising:
    a transmitter having a transmitter antenna; and
    an energy receiver having a plurality of energy receiver antenna elements, wherein the energy receiver antenna elements are each configured to receive a portion of a signal transmitted through the transmitter antenna, convert the portion of the signal into power, and provide the power to one or more components of the wireless device,
    wherein at least one of the energy receiver antenna elements is a weakened receiver antenna.

13. The wireless device of claim 12, wherein a frequency center of the transmitter antenna and a frequency center of at least one of the energy receiver antenna elements are matched.

14. The wireless device of claim 12, wherein the weakened receiver antenna is mismatched with the transmitter antenna in a manner that reduces a level of interference with transmissions from the transmitter antenna.

15. The wireless device of claim 12, wherein the frequency center of the transmitter antenna and a frequency center of the weakened receiver antenna are not matched.

16. The wireless device of claim 12, wherein the transmitter antenna is a first material and the weakened receiver antenna is a second material different from the first material.

17. The wireless device of claim 12, wherein the weakened antenna is positioned closer to the transmitter antenna than is at least one of the energy receiver antenna elements having a frequency center matching the frequency center of the transmitter antenna.

18. The wireless device of claim 12, wherein each of the plurality of energy receiver antenna elements is a weakened receiver antenna.

* * * * *